Jan. 8, 1957 P. A. NOXON ET AL 2,776,807
AUTOMATIC PILOT
Filed Dec. 31, 1943 5 Sheets-Sheet 2

INVENTORS
Paul A. Noxon
BY N. B. Murphy
ATTORNEY

INVENTORS
Paul A. Noxon
BY N. B. Murphy.
ATTORNEY.

Jan. 8, 1957 P. A. NOXON ET AL 2,776,807
AUTOMATIC PILOT
Filed Dec. 31, 1943 5 Sheets-Sheet 5

INVENTORS
Paul A. Noxon
BY N. B. Murphy
ATTORNEY

United States Patent Office 2,776,807
Patented Jan. 8, 1957

2,776,807

AUTOMATIC PILOT

Paul A. Noxon, Tenafly, and Norman B. Murphy, West Englewood, N. J., assignors to Bendix Aviation Corporation, Teterboro, N. J., a corporation of Delaware Application December 31, 1943, Serial No. 516,489

34 Claims. (Cl. 244—77)

This invention relates generally to automatic pilot or control systems for dirigible craft or the like and more particularly to automatic pilot systems having novel provision therefor whereby an automatic turn may be imparted to the craft.

Whenever, in the prior art, it was contemplated to use an automatic turn arrangement in automatic pilot or control systems the functions of course change, rate of course change and attitude change were impressed directly upon the master control instruments which, in turn, developed signals to actuate appropriate craft control surfaces. In this manner unnatural loads were imposed on the instruments thereby impeding, to some extent, their sensitivity and reliability. The desirability of maneuvering a dirigible craft into an automatic turn without calling upon the master instruments to initiate the turn and thereby leaving the instruments free to respond to only those functions of course change, rate of course change and attitude change for which they were designed is obvious.

The present invention eliminates the disadvantages arising with known arrangements and contemplates the provision of a novel automatic turn arrangement with the operation of which the craft control surfaces are immediately deflected into proper positions for initiating the desired turn completely independently of the master instruments, the latter responding only to craft maneuvers to inform the human pilot of the instantaneous craft attitude once the craft has gone into a turn.

An object of the present invention, therefore, is to provide an improved and novel automatic pilot and/or control system for dirigible craft.

Another object of the present invention is to provide an improved automatic pilot for dirigible craft having a novel automatic turn mechanism incorporated therein.

A further object is to provide a novel automatic pilot adapted for automatically making correctly banked turns at any desired rate.

A still further object of the invention is to provide a novel automatic pilot whereby the correct angle of bank and the required correction in pitch are automatically obtained for any desired rate of turn which may be set in automatically by the human pilot.

Another object is to provide a novel automatic pilot having an automatic turn mechanism incorporated therein which, upon actuation, disconnects the direction control instrument from the rudder and places the rudder under the control of the turn mechanism, the rate of turn instrument upon initial operation of the turn mechanism remaining in its normally vertical position.

A further object is to provide a novel automatic pilot for dirigible craft having an automatic turn mechanism incorporated therein whereby the craft may be thrown automatically into any desired turn and should any slackening occur in the turn it will be met automatically with appropriate rudder while any tendency on the part of the craft to turn at a faster rate than the predetermined rate will automatically result in a reverse rudder.

Another object is to provide a novel automatic turn mechanism for automatic pilots adapted for automatically controlling dirigible craft which, upon actuation to initiate a craft turn, disconnects the direction control instrument from the rudder servo and assumes primary control of the rudder and which, upon operation to terminate the turn, immediately re-establishes connection between the direction control instrument and the rudder servo whereby the craft is maintained automatically on its new course.

A still further object is to provide an improved automatic pilot having a novel automatic turn mechanism therefor which is adapted for maneuvering the craft into an automatic turn at the correct banking angle for a desired turn, an airspeed adjustment being provided to assure correct angles of bank for widely differing airspeeds.

Another and further object of the present invention is to provide an improved automatic pilot for dirigible craft having a novel automatic turn mechanism therefor together with a novel control panel for operating the mechanism, the panel comprising a relatively simple and compact arrangement embodying a minimum number of control elements thereon.

A still further object is to provide a compact and novel control panel for an automatic pilot embodying a novel automatic turn mechanism therein of the character described for controlling the direction and attitude of a craft, the panel being provided with pitch and bank trim knobs for readily trimming elevator and aileron surfaces as required during linear flight. By manipulation of the pitch trim knob, the craft may be made to climb or dive and will continue to climb or dive at an angle corresponding to the setting of the pitch trim knob until the latter is returned to a central position. Moreover, a single turn control knob is provided on the panel whereby the craft may be made to turn at any desired rate, the correct angle of bank for that turn as well as the necessary amount of elevator trim for that turn being simultaneously introduced upon operation of the turn control knob.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only, and are not designed as a definition of the limits of the invention.

In the drawings, wherein like reference characters refer to like parts throughout the several views.

Figure 1:
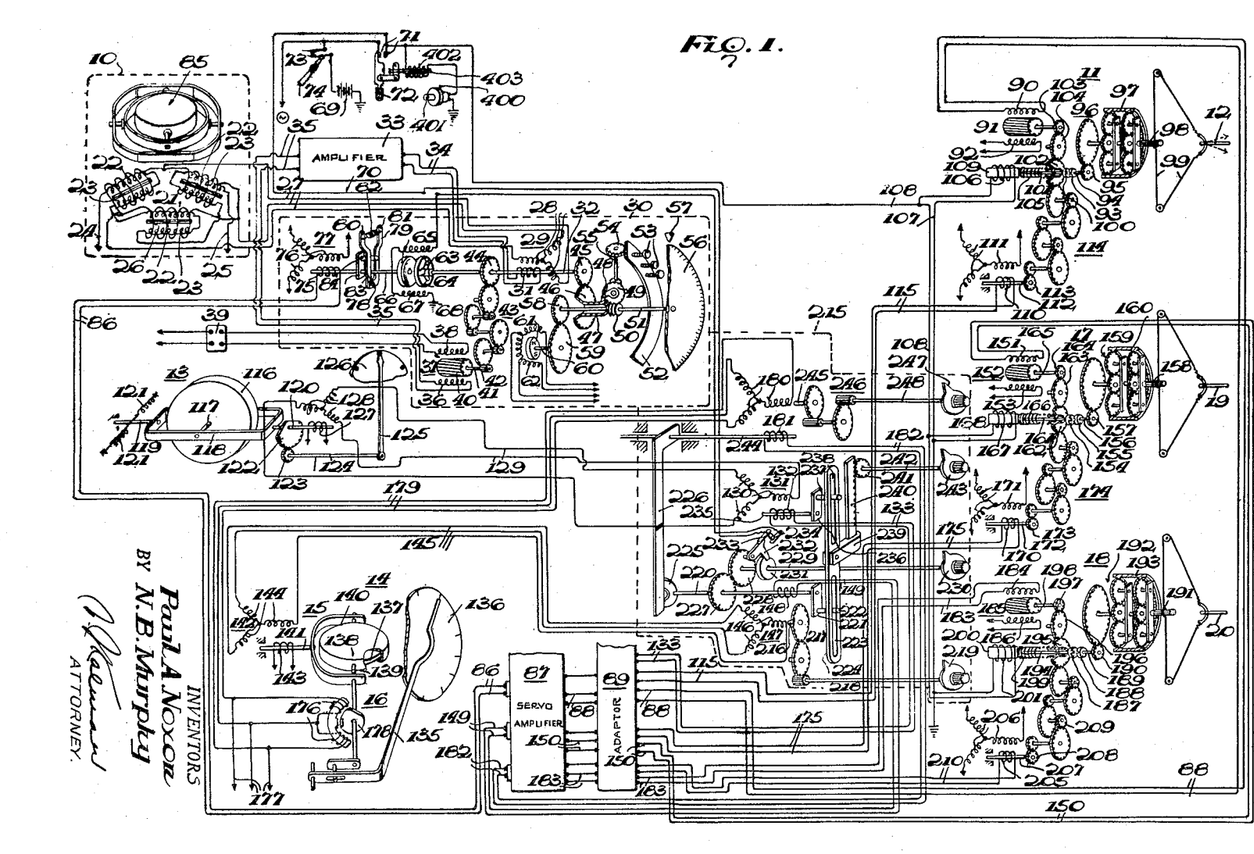
Figure 1 is a diagrammatic illustration of an automatic control system for dirigible craft embodying the novel automatic turn mechanism of the present invention.

Referring now to the drawings for a more detailed description of the present invention and more particularly to Figure 1 thereof, it is there shown as embodied in an all electric automatic pilot providing three axes of control, claimed and described more fully in copending application Serial No. 516,488, filed December 31, 1943, and now Patent No. 2,625,348, issued January 13, 1953, to P. A. Noxon et al.

The automatic pilot, as shown, comprises a magnetic field pick-up device, generally designated with the reference character 10, in the form of a gyro-stabilized earth inductor compass, for generating an electrical signal during craft deviation from a prescribed course, proportional to the amount of deviation, for energizing a rudder servo system 11 to actuate a rudder 12; a rate of turn responsive gyro 13 adapted for generating an electrical signal proportional to the rate of turn which is superimposed upon the directional signal to modify the energization of the rudder servo system 11; and an artificial horizon gyro 14 having bank and pitch take-offs 15 and 16 for generating signals in proportion to the bank and pitch of the craft for energizing aileron and elevator servo motor systems 17 and 18 to actuate ailerons and elevators 19 and 20.

Since the automatic pilot per se is described in greater detail in the Patent No. 8,625,348, only so much of it will be considered herein as is necessary to a better understanding of the principles and operation of the present invention.

The magnetic field pick-up device for generating an electrical signal proportional to the amount of craft deviation from a prescribed course comprises a triangular element 21 having three laminated legs. Each leg is provided with a pair of exciting windings 22, 23 connected in series opposed relation with each other and with a suitable source of alternating current (not shown) by way of leads 24 and 25. Wound in inductive relation to the first coils, which may be considered as the primary windings of the device, is a delta connected coil 26, which may be termed as the secondary winding of the device. Coil 26 is provided with three taps for connecting it by way of leads 27 with a three phase wound stator 28 of an inductive coupling device 29 suitably mounted within a master indicator 30.

Coupling device 29 is provided with an angularly movable rotor winding 31 inductively associated with the stator windings 28 and carried by a shaft 32 for angular motion relative thereto. Winding 31 is connected to the input of a suitable vacuum tube amplifier 33 by way of leads 34. The output of the amplifier 33 is fed by way of leads 35 to one phase winding 36 of a two phase induction motor 37 whose second phase winding 38 is connected with the source of A. C. current through a suitable frequency doubler 39. The frequency doubler is also provided with a conventional phase shifting network to maintain the voltages within the two phase windings substantially 90° apart as is known in the use of such motors.

Motor 37 has a suitable rotor 40 carried by a shaft 41 provided at its outer end with a pinion 42 adapted for driving through a speed reduction gear system 43, a gear 44 fastened to rotor shaft 32. A gear 45, supported by the free end of shaft 32, meshes with a gear 46. Connected to gear 46 or formed integrally therewith is a hollow shaft 47 supporting by way of an arm 48 the shaft of a worm 49 which meshes with a worm 50 formed on or carried by a spindle shaft 51 which is received within hollow shaft 47. An annular compensator 52 having a series of adjusting screws 53 in engagement therewith is contacted by a follower 54 supported by an arm 55 fastened to the shaft of worm 49. Thus, in addition to any motion imparted by rotor shaft 32 to spindle shaft 51, the latter is also moved a small angular amount in one direction or another depending upon the contour of element 52 engaged by follower 54.

One end of spindle 51 carries a suitable indicating dial 56 for cooperation with a fixed index 57 while the opposite end of the spindle carries a gear 58 for meshing with a gear 59 carried by a shaft 60. Also carried by shaft 60 is a magnetic rotor 61 which is magnetically coupled with a stator winding 62 of an electro-magnetic transmitter, the latter being adapted for connection to a similar device acting as a receiver located at a remote station to reproduce the indication of heading.

The free end of rotor shaft 32 carries through a resilient supporting member 63 one face 64 of a novel magnetic clutch, claimed and described more fully in copending application Serial No. 513,421, filed December 8, 1943, and now Patent No. 2,407,757, issued September 17, 1946, to A. MacCallum. A cooperating clutch face 65 is supported by a suitably journalled shaft 66. Both clutch faces 64, 65 are formed of magnetic material, and a suitable coil 67 surrounds the clutch faces. One end of coil 67 is grounded as at 68 and the other end is connected with a battery 69 by way of normally closed control switch at the turn mechanism to be presently described, a lead 70, contacts 71 of a servo clutch switch 72 and contacts 73 of a power switch 74.

With the closing of switches 74 and 72, and the control switch at the turn mechanism, coil 67 is energized and clutch faces 64, 65 are brought into driving engagement. Thereafter any motion of shaft 32 is transmitted to shaft 66 which also supports thereon, for angular motion therewith, a rotor winding 75 inductively associated with a three phase wound stator 76 of an inductive transmitting device 77.

For the purpose of obtaining automatic synchronization of controls, two lever arms 78 and 79 within the master indicator are pivoted on fixed pins 80 and 81 and interconnected through a resilient member 82 anchored to both arms slightly below pivot pins 80 and 81. A bracket 83 is fastened to shaft 66 and is provided with a pin 84 positioned in between arms 78 and 79. Thus, upon clockwise rotation of shaft 66, for example, pin 84 will move arm 79 outwardly when a turning torque is exerted on shaft 66, spring 82 returning the arm and pin as well as shaft 66 to neutral when the torque is no longer applied, that is, when the clutch is disengaged, while upon a counterclockwise rotation of shaft 66, pin 84 urges arm 78 outwardly, the arm returning pin 84 and shaft 66 to neutral under the action of spring 82 when the turning torque is released.

The foregoing synchronization feature is claimed and described in greater detail in copending application Serial No. 516,490, filed December 31, 1943, and now Patent No. 2,674,423, issued April 6, 1954, to P. A. Noxon. As a result of such provision rotor winding 75 of transmitter 77 will always be urged to and maintained at an electrical zero prior to the engagement of the automatic steering system. This means that no matter how much the craft course has been changed, once it is placed on a desired course and the automatic pilot is engaged, rotor winding 75 will only have a signal generated therein of an amount proportional to the angle of deviation by the craft from the desired course.

Element 21 of the magnetic field pick-up device together with its primary and secondary windings is stabilized and maintained in a horizontal plane by means of a stabilizing gyroscope or gyro vertical, generally designated with the reference character 85, so that a compass is provided in which, for all practical purposes, turning and acceleration errors are eliminated.

As described more fully in Patent No. 2,674,423, upon a craft departure from a prescribed course, the voltages induced within coil 26 of the pick-up device are varied to vary the voltages at coupling stator 28 whereby a signal is induced within rotor winding 31, proportional to the amount of craft departure from its course. This signal is amplified within amplifier 33 to energize phase winding 36 of motor 37 whose second phase is continuously energized from the source of alternating current. Rotor 40 of motor 37 drives shaft 32 and rotor winding 31 to a null position, i. e., one wherein the electrical axis of the rotor winding is perpendicular to the resultant magnetic field of the stator windings, whereupon the induced signal drops to zero and motor 37 is de-energized. At the same time, assuming clutch faces 64, 65 to be in driving engagement, rotor windings 75 of transmitting device 77 is moved angularly relative to stator windings 76 and a signal is induced therein proportional to the amount of craft departure from its prescribed course.

The electrical signal thus generated within rotor winding 75 is fed by suitable leads 86 to the input of a suitable servo vacuum tube amplifier 87. The output from amplifier 87 is fed by way of outlet leads 88 through a servo adapter 89 to energize one phase winding 90 of an induction motor 91 whose second phase winding 92 is continuously energized from the craft's source of A. C. current.

A driving connection between motor 91 and rudder 12 is established by the engagement of the two faces of a servo clutch. The first clutch face 93 is mounted upon a shaft 94 carrying a pinion 95 thereon for engagement with a speed reduction gear system 96 supported within a relatively stationary servo casing 97 for driving a rudder shaft 98 connected by means of cables 99 with rudder 12. The second clutch face 100 is fastened to a shaft 101 keyed to a gear 102 but adapted for longitudinal motion relative thereto, gear 102 connecting with a pinion 103 of motor 91 through an idler gear 104. One end of shaft 101 has an enlarged portion defining an abutment for one end of a spring member 105, and the other end of the shaft rests against gear 102.

The actuating means for axially moving shaft 101 to the right to force the clutch face 100 to drivably engage clutch face 93 comprises a solenoid coil 106 grounded at one end by way of a lead 107 and connected to one of contacts 71 of servo clutch switch 72 by way of a lead 108. With switch 72 closed, a core 109 of the solenoid is urged to the right against the action of a spring 105 to axially move shaft 101 therewith. This movement engages the clutch faces so that motor 91 drives rudder 12.

In driving gear 102, motor 91 also angularly displaces a rotor winding 110 of an inductive follow-back device having a three phase wound stator 111, the rotor being supported by a shaft 112 having a pinion 113 which is drivably connected to gear 102 through a suitable speed reduction gear train 114. Displacement of rotor winding 110 relative to stator windings 111 during operation of motor 91 generates an electrical follow-back signal. By means of leads 115, this follow-back signal is fed to amplifier 87 through servo adapter 89 to be impressed upon the direction signal within the amplifier to modify the operation of the motor. The follow-back signal opposes the direction signal and at such time that the follow-back signal is equal and opposite to the direction signal motor 91 becomes de-energized.

Departure of the craft from its prescribed course develops a certain amount of angular velocity which a rate gyro 13 takes into account in the control of rudder 12. The normally horizontal spin axis of the gyro rotor 116 is supported by way of inner trunnions 117 within a gimbal ring 118, the latter being mounter upon a rigid support by way of trunnions 119 and 120 for oscillation about a second horizontal axis perpendicular to the spin axis. Resilient members 121 secured to trunnion 119 yieldably restrain gyro precession during return to a rate of turn function. Trunnion 120 of gyro 13 carries a gear sector 122 for meshing with a pinion 123 mounted on a spindle shaft 124 carrying an indicator 125 adapted for cooperation with a suitable scale 126, as well as a rotor winding 127 inductively associated with a three phase wound stator 128 of an inductive device, the rotor being connected for energization by the craft's source of A. C. current.

The windings of stator 128 connect by way of leads 129 with a three phase wound stator 130 of an inductive receiver device 131 whose rotor winding 132 is connected to adapter 89 by way of leads 133 to be there superimposed upon the follow-back signal to further modify the operation of motor 91 when the craft departs from a predetermined course. Due to such departure, the induced voltages within stator 128 vary causing a corresponding change in the voltages of stator windings 130 whereupon a signal proportional to the rate of turn is generated within rotor winding 132 to be algebraically added to the direction and follow-back signals energizing phase winding 90 of motor 91.

With the foregoing arrangement, during an initial departure of the craft from a prescribed course, the rate signal adds with the direction signal and opposes the follow-back signal to hasten outward movement of rudder 12. The rudder is operated until the follow-back signal equals and opposes the rate and direction signals whereupon the motor is de-energized. At this time, the rudder has reached a definite outward position. The applied rudder causes the craft to swing back to its prescribed course at which time the rate signal drops to zero and then builds up again in an opposite direction to oppose the direction signal, which now diminishes, but adds to the follow-back signal until the rudder is returned to a neutral position. The rotor winding 110 of the follow-back device is driven to a null at the neutral position, and the follow-back signal drops to zero.

Except for the absence of the rate signal, substantially the same action takes place at the other two control axes of the craft. Horizon gyroscope 14 comprises an artificial horizon which may have a horizon bar 135 and a mask 136. Up and down movement of the bar 135 relative to a mask 136 designates craft pitch, and angular movement of the mask relative to the bar for designater craft bank. The electrically driven rotor 137 of gyroscope 14 has a normally vertical spin axis mounted within a rotor bearing frame 138. Inner trunnions 139 mount the rotor and frame within a gimbal ring 140 for oscillation about a first horizontal axis, and an outer trunnion 141 mounts the gimbal and frame for oscillation about a second horizontal axis perpendicular to the first.

Bank take-off 15 comprises an inductive transmitter device 142 having a rotor winding 143 carried by outer trunnion 141 and energized from the craft's source of alternating current. Rotor 143 is inductively associated with a three phase wound stator 144 which connects by way of leads 145 with a three phase wound stator 146 of an inductive receiver device 147 having a rotor winding 148 inductively coupled therewith. Thus, any change of voltages caused within stator 144 due to angular movement of rotor winding 143 creates a like change in the voltages of stator 146 whereby a signal is induced within rotor winding 148 proportional to the amount of craft bank.

The electrical signal induced within rotor winding 148 is fed into amplifier 87 by way of leads 149. The output from amplifier 87 is fed through servo adapter 89 by way of outlet leads 150 to one phase winding 151 of a two phase induction motor 152 whose second phase winding 153 is continuously energized from the craft's source of A. C. current. Motor 152 constitutes a part of the aileron servo system 17 and a driving connection is established between it and ailerons 19 through solenoid operated clutch faces 154 and 155. Clutch face 155 is carried by a shaft 156 provided with a pinion 157 thereon for driving aileron driving shaft 158 through a speed reduction gear system 159 supported within a relatively stationary casing 160, and clutch face 154 is carried by a shaft 161 which has a gear 162 keyed thereto but is adapted for axial movement relative thereto. Gear 162 is driven by motor 152 through an idler 163 which meshes with a pinion 164 carried by a motor shaft 165. Clutch faces 154 and 155 are normally held disengaged by virtue of a resilient spring 166 which abuts gear 162 at one of its ends and an enlarged portion of shaft 161 at its other end to urge the latter shaft to the left. The actuating means for axially moving shaft 161 to the right to force clutch face 154 to drivably engage clutch face 155 comprises a solenoid coil 167 which is connected to conductor 107 at one end to ground and at its other end to contact 71 of switch 72 by way of lead 108. With switch 72 in its "on" position, i. e., with contacts 71 engaged, coil 167 is energized to urge a core 168 to the right against the action of spring 166 whereupon shaft 161 is moved to the right to bring clutch faces 154 and 155 into engagement. Thus, a driving connection is established between motor 152 and ailerons 19.

In driving gear 162, motor 152 also angularly displaces a rotor winding 170 of an inductive follow-back device having a three phase wound stator 171, the rotor winding being inductively coupled with the stator and being carried by a shaft 172 having a pinion 173 thereon which drivably connects with gear 162 through a suitable speed reduction gear train 174. Displacement of the rotor winding relative to stator 171 during operation of motor 152 generates an electrical follow-back signal. By way of leads 175, this follow-back signal is fed to amplifier 87 through servo adapter 89 to be impressed upon the bank signal within the amplifier to modify operation of motor 152. The follow-back signal opposes the bank signal and at such time that the follow-back signal is equal and opposite to the bank signal motor 152 becomes de-energized.

Pitch take-off 16 comprises an inductive transmitter device having stator windings 176 provided with three taps, the windings being energized from the craft's source of A. C. current by virtue of leads 177. A rotor 178 in the form of a magnetic vane is inductively associated with the stator and is secured to inner trunnion 139 for angular movement relative to the stator windings. Stator windings 176 connect by way of leads 179 with a three phase wound stator 180 of an inductive receiver device having a rotor winding 181 inductively associated therewith so that any change in voltages caused within stator windings 176 due to angular movement of rotor 178 creates a like change in the voltages of stator 180 whereby a signal is induced within rotor 181 proportional to the amount of craft pitch.

The signal induced within rotor winding 181 is fed by conductors 182 to amplifier 87 and out therefrom through servo adapter 89 by way of outlet leads 183 to one phase winding 184 of a two phase induction motor 185 whose second phase winding 186 is continuously energized from the craft's source of A. C. current.

Motor 185 constitutes a part of the elevator servo system 18 and a driving connection is established between it and elevator surfaces 20 through solenoid operated clutch faces 187 and 188. Clutch face 188 is carried by a shaft 189 provided with a pinion 190 thereon for operating elevator driving shaft 191 through a speed reduction gear system 192 supported within a relatively stationary casing 193, and clutch face 187 is carried by a shaft 194 which has a gear 195 keyed thereto but is adapted for axial movement relative thereto. Gear 195 is driven by motor 185 through an idler 196 which meshes with a pinion 197 carried by a motor shaft 198.

Clutch faces 187 and 188 are normally disengaged by virtue of a resilient spring 199 which abuts gear 195 at one of its ends and an enlarged portion of shaft 194 at its other end to urge the latter shaft to the left. The enlarged end of shaft 194 is engaged by a core 200 of a solenoid whose coil 201 is grounded at one end by being tapped to lead 107 and at its other end is connected by way of lead 108 to one of contacts 71 of switch 72. With the switch in its "on" position, i. e., with contacts 71 engaged, coil 201 is energized to urge core 200 to the right whereupon shaft 194 is moved to the right to bring clutch face 187 into engagement with clutch face 188 whereby a driving connection is established between motor 185 and elevators 20.

In driving gear 195, motor 185 also angularly displaces a rotor winding 205 of an inductive follow-back device having a three phase wound stator 206, the rotor being inductively coupled with the stator and supported by a shaft 207 having a pinion 208 which is drivably connected to gear 195 through a suitable speed reduction gear train 209. Displacement of rotor winding 205 during operation of motor 185 generates an electrical follow-back signal which is fed by way of leads 210 to amplifier 87 through servo adapter 89 to be impressed upon the pitch signal within the amplifier to thereby modify operation of motor 185. The follow-back signal opposes the pitch signal and at such time that the follow-back signal is equal and opposite to the pitch signal motor 185 becomes de-energized.

With servo clutch switch 72 in an open or "off" position, even though power switch 74 is closed, coil 67 of the magnetic clutch within master indicator 30 is de-energized so that clutch face 64 is disengaged from clutch face 65 and simultaneously solenoid coils 106, 167 and 201 of the rudder, aileron and elevator servo systems are de-energized whereby motors 91, 152 and 185 are disconnected from their respective control surfaces so that subsequent control of the rudder, aileron and elevator surfaces may be performed manually in the conventional manner.

Coming now to the novel automatic turn control mechanism of the present invention, it is shown schematically in Figure 1 as encased within a casing 215 and includes principally the inductive rate, bank and pitch receiver devices.

Stator 146 of the inductive bank receiver device is mounted for angular movement relative to its rotor 148 by means of a shaft 216 which connects through a suitable gear train 217 with a shaft 218 carrying a bank trim knob 219 thereon. Rotor winding 148 of the same device is, in turn, supported for angular movement relative to stator 146 by a shaft 220 which at one of its ends has secured thereto a bracket 221 provided with a pin 222 engaging a slot 223 of a lever 224 and at its other end carries a cam member 225 cooperating with a lever 226, whose purpose will presently appear, together with a gear 227 which meshes with another gear 228 fastened to a shaft 229 carrying a turn knob 230 at the free end thereof. Also carried by shaft 229 adjacent gear 228 is a wheel 231 provided with a notch in which normally rests an arm 232 carrying a contact 233 normally engaging a second contact 234, one of which is connected to coil 67 of the magnetic clutch of the master indicator and the other of which is connected to lead 70 whereby coil 67 is in closed circuit with battery 69.

Stator 130 of the inductive rate receiver device is stationary. However, rotor 132 is mounted for angular movement relative to the stator by means of a shaft 235 which carries a bracket 236 supporting a pin 237 thereon which engages a second slot 238 of lever 224. The lever itself is supported by a bracket 239 which is fastened to a toothed rack 240 meshing with a pinion 241 carried by a shaft 242 having an airspeed adjustment knob 243 at its free end.

Rotor 181 of the inductive pitch receiver device is mounted for angular motion relative to stator 180 by means of a shaft 244 which is fastened to lever 226 whereby upon movement of cam 225 lever 226 is swung in a clockwise direction to move shaft 244 and rotor 181. Cam 225, being provided with two high points (better shown in Figure 5 as a two part cam 349—350) will always swing lever 226 and its shaft 224 in one direction only, namely to provide up-elevator, whether motion of shaft 220 be clockwise or counterclockwise. Stator 180, on the other hand, is mounted for angular motion relative to rotor 181 by means of a shaft 245 which connects through a speed reduction gearing 246 with a pitch trim knob 247 carried by a shaft 248.

For unequal loading conditions or for a condition wherein for some reason or another the condition of equilibrium between the inductive transmitting device 142 of the bank take-off and the inductive receiver device 147 has been destroyed, the bank trim knob 219 may be operated to angularly displace stator 146 in one direction or another relative to rotor 148 until the condition of balance has been re-established.

With the automatic pilot engaged, the craft may be forced into a climb by operating pitch trim knob 247 to displace stator 180 relative to its rotor 181. The craft will be maintained in such climb until knob 247 is returned to neutral. To bring the craft into a dive, knob 247 is operated in a reverse direction to reverse movement of stator 180. At this time, the signal induced in rotor 181 is reversed to reverse operation of the elevator servo system 18.

If, during the course of linear flight with the automatic pilot engaged, it is desired to change course, the human pilot need merely displace turn knob 230 an angular amount proportional to the rate of turn desired. Operation of knob 230 turns wheel 231 so that arm 232 is forced outwardly from the notch of the wheel and contacts 233 and 234 become disengaged. Thus, the circuit to coil 67 of the magnetic clutch of the master indicator is opened to de-energize coil 67 and inductive transmitting device 77 is disconnected from the inductive coupling device 29 so that the direction signal no longer acts to energize motor 91 of the rudder servo system. At the same time, gear 228 is turned with knob 230 and it, by virtue of being in mesh with gear 227, displaces rotor 148 relative to stator 146 thereby creating a condition of electrical unbalance between the stator and the rotor so that a bank signal is generated within rotor 148 even though at that moment the artificial horizon shows no bank and the bank take-off 15 is in a neutral position.

Motion of rotor 148 simultaneously causes angular movement of bracket 221 and pin 222, the latter, by virtue of its engagement with slot 223, pivots lever 224 about a pin carried by supporting bracket 239. Movement of lever 224 also displaces pin 237 which results in angular motion on the part of rotor 132 relative to its stator 130, such motion creating an electrical unbalance resulting in a rate signal being generated in rotor 132 notwithstanding the fact that at that moment the craft is in linear flight and rate gyro 13 as well as the rate take-off are in a neutral position.

As turn knob 230 displaces rotor 148 it also angularly displaces cam 225 which pivots lever 226 to angularly displace rotor winding 181 relative to its stator 180. Thus an electrical unbalance is created between the two resulting in the generation of a pitch signal within rotor 181 even though the craft at that moment is in a level attitude so that pitch take-off 16 is in a neutral position. Whether the desired turn be to the right or to the left of a given course, rotor 181 will be displaced in one direction to provide a signal calling for up-elevator in either case to overcome the tendency of the craft to dive when the turn is initiated.

It will now be understood that upon operation of turn knob 230 the conditions for a desired turn are automatically established without loading or calling upon the rate gyro or the artificial horizon to control the turn and, moreover, the course maintaining means is disconnected from the rudder servo system. The desired signals set in by knob 230, i. e., the bank signals within rotor 148, the rate signal within rotor 132 and the pitch signal within rotor 181 are fed into their respective networks to control related surfaces to swing the craft into a desired turn at the correct angle of bank for that turn together with the necessary up-elevator.

The automatic turn is accomplished and maintained as long as desired by virtue of the fact that the rate signal generated within rotor 132 is fed by leads 133 and adapter 89 to the rudder servo network of amplifier 87 and out therefrom by way of leads 88 to energize phase winding 90 of motor 91. Rudder 12 is actuated by motor 91 and, simultaneously therewith, rotor 110 of the inductive rudder follow-back device is displaced angularly relative to stator 111 whereby a follow-back signal is generated and fed by way of leads 115 to be superimposed upon the rate signal in the rudder network of the amplifier. Rudder 12 is deflected until the follow-back signal is equal and opposite to the rate signal at which time motor 91 is de-energized.

At the same time, the bank signal generated within rotor 148 is led off by means of leads 149 to the aileron network of amplifier 87 and out therefrom through adapter 89 and leads 149 to phase winding 151 of motor 152. Ailerons 19 are actuated by motor 152 and, simultaneously therewith, rotor 170 of the inductive aileron follow-back device is displaced angularly relative to stator 171 whereby a follow-back signal is generated and fed by way of leads 175 to be superimposed upon the bank signal in the aileron network of the amplifier. Ailerons 19 are actuated outwardly until the follow-back signal is equal and opposite to the bank signal at which time motor 152 is de-energized.

The same operation takes place in response to the pitch signal generated within rotor 181. The signal so generated is fed into the elevator network of amplifier 87 by way of leads 182 and out therefrom by way of leads 183 to energize phase winding 184 of motor 185. Elevators 20 are actuated by motor 185 and, at the same time, rotor 205 of the inductive elevator follow-back device is displaced relative to stator 206 whereby a follow-back signal is generated and fed by way of leads 210 to be superimposed upon the pitch signal in the elevator network of the amplifier. Elevators 20 are actuated outwardly until the follow-back signal is equal and opposite to the pitch signal at which time motor 185 is de-energized.

With the operation thus far described the craft will be swung into the desired turn with rudder, ailerons and elevators displaced as described. The direction, rate of change of course and the banked attitude of the craft all are now registered by the dial 56 of the master indicator, rate gyro 13 and artificial horizon 14. The ensuing displacements of rotor 127 relative to stator 128 of the rate take-off and rotor 143 relative to stator 144 of the bank take-off, re-establish the position of electrical equilibrium with the rate and bank inductive devices at the control panel so that the rate signal within rotor 132 disappears and the bank signal of rotor 148 likewise disappears. Because both rotors 110 and 170 of the inductive follow-back devices of the rudder and aileron servo systems are at that moment displaced from their nulls their signals are effective through the rudder and aileron networks of amplifier 87 to reverse operation of motor 91 and 152 to bring rudder 12 and ailerons 19 to their neutral positions. Thus, after the craft assumes the proper turn at the correct angle of bank the rudder and aileron surfaces will be back in their neutral positions. It will now be obvious that should the craft turn at slower or faster rates than that selected, the rate gyro 13 will dominate to apply right or left rudder as the case may be to regulate the rate of turn to be maintained at the preselected value.

On approaching the new course, the turn may be terminated by operating turn knob 230 back to its neutral position. This action again creates signals within rotors 132, 148 and 181 of the inductive receivers at the control panel, in a direction opposite to the direction of the signals generated when the original turn was initiated, which control the rudder, aileron and elevator surfaces in a direction to establish level attitude of the craft. As soon as the level attitude is attained, the condition of electrical equilibrium is established between the rate, bank and pitch take-offs and their related inductive receiver devices at the control panel so that the rate, bank and pitch signals within the rotors of the latter devices, set in with the return of turn knob 230 to neutral, disappear and the follow-back signals of the rudder, aileron and elevator inductive follow-back devices return the related control surfaces to their neutral positions.

As soon as turn knob 230 is brought to its neutral position, arm 232 falls within the notch of wheel 231 engaging contact 234 with contact 233 whereby the circuit to the coil 67 of the magnetic clutch of the master indicator is closed and clutch faces 64 and 65 engaged so that any departure from the new course results in applied rudder to return and maintain the craft on the new course.

Airspeed adjustment knob 243 is normally set for a cruising speed and the automatic turn mechanism will operate as desired with the setting so made. Should, however, the speed of the craft be changed substantially, the proportional constant between the angle of bank and the rate of turn must be necessarily changed. This is accomplished by turning knob 243 which results in motion of rack 240 whereby the pivot point of lever 224 is moved relative to pins 222 and 237 of the bank and rate inductive receiver devices thereby changing the lever length of each of the devices.

The various networks of amplifier 87 and the hook-up of adapter 89 have been mentioned generally only in their connection with the various control signals. For a more detailed description of the electrical circuits of the automatic pilot reference is made to the aforementioned Patent No. 2,625,348.

Figure 2:
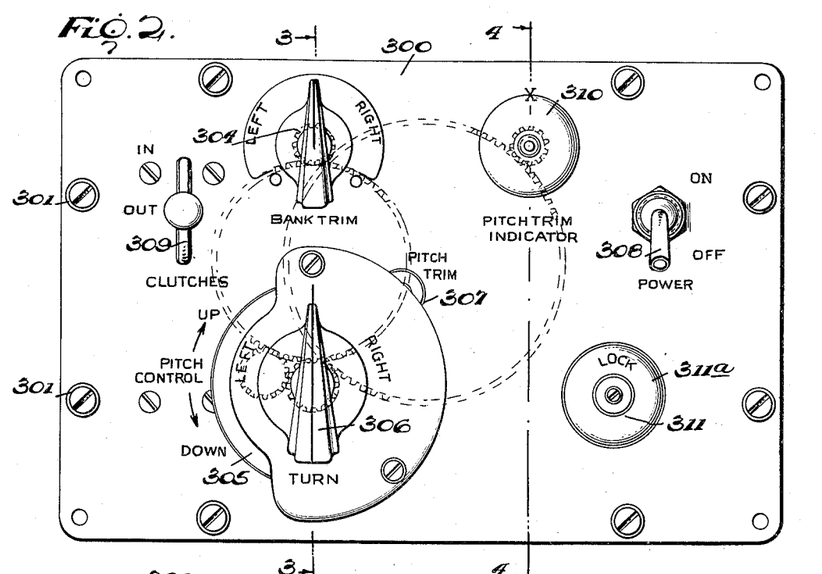
Figure 2 is a front elevation view of a novel control panel for operating the automatic turn mechanism of the present invention.
Figure 3:
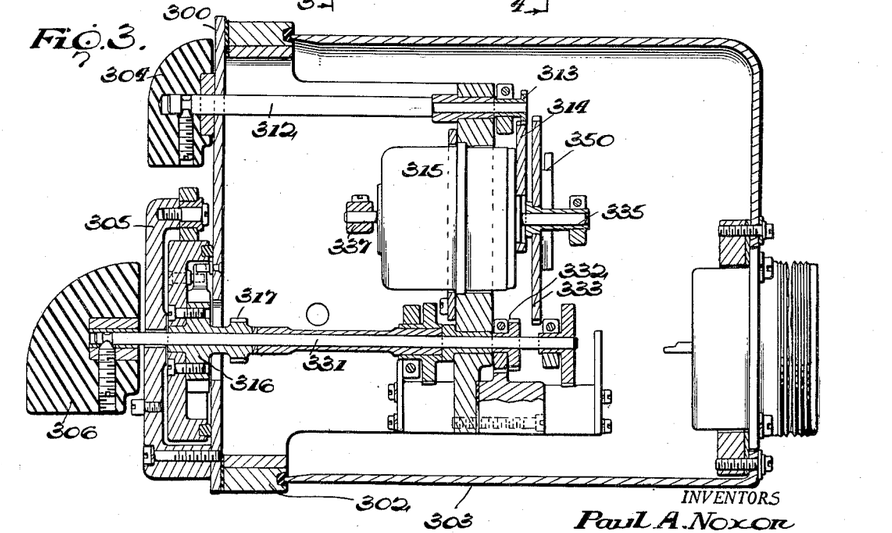
Figure 3 is a section view taken substantially along line 3—3 of Figure 2.
Figure 4:
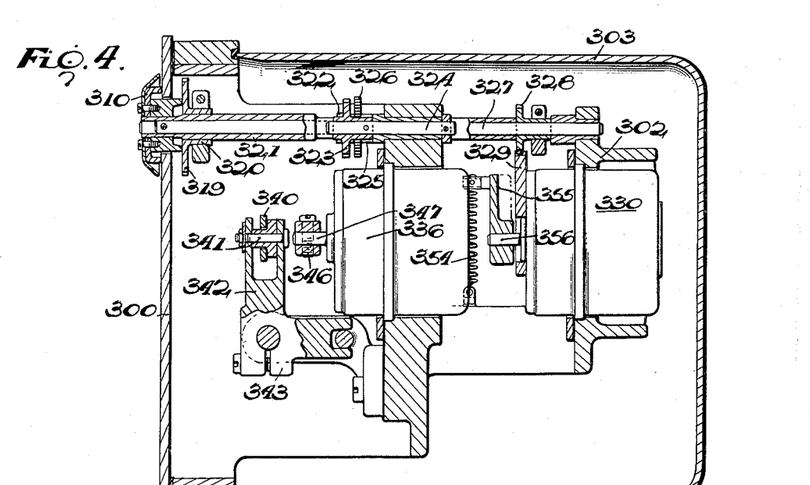
Figure 4 is a section view taken substantially along line 4—4 of Figure 2.

Referring now to Figures 2 to 10, inclusive, of the drawings there is shown one practical embodiment of a novel control panel for actuating the novel automatic turn mechanism shown schematically in Figure 1 and described hereinabove. As shown in Figures 2 and 3, control panel 300 is suitably fastened by means such as screws 301 to a supporting casing 302 having a housing 303 therefor. The exterior of the panel is provided with a bank trim knob 304, a pitch control knob 305 together with an automatic turn control knob 306 superimposed thereover, as well as a vernier pitch trim knob 307. Also contained on the panel are power switch 308, servo clutch switch 309, a pitch trim indicator 310 and an airspeed adjustment knob 311 having a locking member 311a therefor.

Bank trim knob 304 is fastened to a shaft 312 (Fig. 3), suitably journalled within casing 302, provided with a pinion 313 meshing with a gear sector 314 secured to the casing of an inductive receiver device 315 which is rotatably supported within a part of casing 302 and having arranged therein a three phase wound stator (similar to stator 146 of Figure 1). Actuation of knob 304 angularly displaces the casing of device 315 and its stator relative to the rotor (similar to rotor winding 148 of Figure 1) so that an electrical unbalance is created between the two thereby generating an electrical signal within the rotor of device 315 independently of the bank take off means arranged at the artificial horizon to which the inductive receiver device is connected. Thus the proper amount of aileron displacement is derived as heretofore explained in connection with Figure 1.

Figure 7:
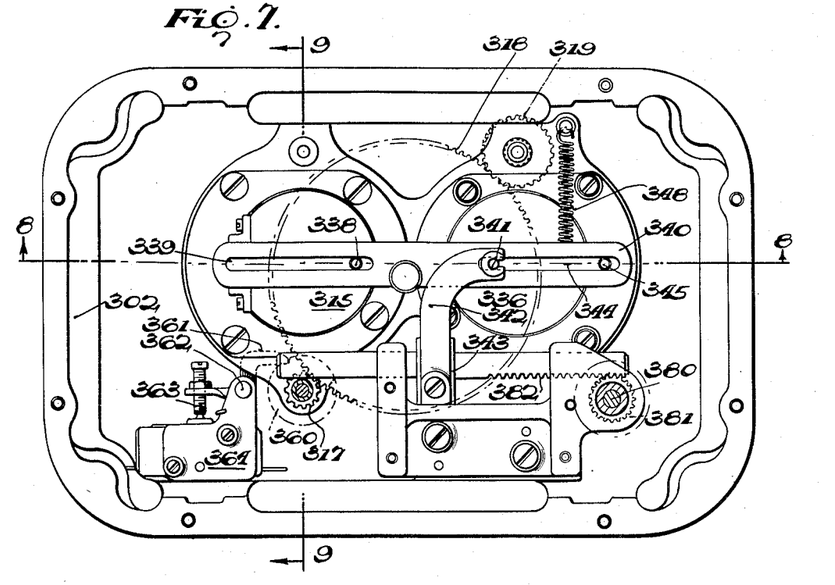
Figure 7 is a front elevation view of the structure of Figure 2 with the front panel removed.

Pitch control knob 305 is fastened to a hollow sleeve 316, as better shown in Figure 3, which has secured thereto or formed integrally therewith a pinion 317 meshing with a large gear 318, shown in dotted lines in Figure 7, the latter, in turn, meshing with a pinion 319 (Figure 4) carried by a sleeve 320 clamped to a hollow shaft 321 which at its free end supports a pinion 322. The pinion drives a gear 323 carried by a second shaft 324 which also supports thereon a pinion 325 meshing with a second gear 326 pinned to a shaft 327 which is arranged within hollow shaft 321. This gear reduction drive is more clearly shown in Figure 10.

One end of inner shaft 327 carries pitch trim indicator 310 exterior of the panel and the other end of the shaft has a gear 328 fastened thereto for driving a gear sector 329 secured to the casing of an inductive receiver device 330 which is rotatably supported within a part of casing 302 and having arranged therein a three phase wound stator (similar to stator 180 of Figure 1). Actuation of pitch control knob 305 angularly displaces the casing of device 330 and its stator relative to the rotor (similar to rotor winding 181 of Figure 1) so that an electrical unbalance is created between the two thereby generating an electrical signal within the rotor of device 330 independently of the pitch take-off arranged at the artificial horizon to which the inductive receiver device is connected. Thus, the proper amount of elevator displacement is derived to cause the craft to climb or dive as heretofore explained in connection with Figure 1. For fine adjustments desired during unbalanced loading conditions, pitch trim knob 307 is provided which may engage pitch control knob 305 through a suitable reduction gear (not shown). Trim indicator 310 indicates to the human pilot whether or not the elevators are in a neutral position.

By operating a single knob, i. e., turn knob 306, the craft may be swung into an automatic turn and maintained in such attitude until the knob is returned to its neutral position. As shown in Figure 3, knob 306 is fastened to a shaft 331 which passes through hollow sleeve 316 and carries near its free end a gear 332 which drives a gear 333 through a pinion 334, better shown in Figure 5. Gear 333 is sleeved or clamped to a shaft 335 of the rotor of inductive device 315 whereby motion of knob 306 causes angular displacement of the rotor relative to its stator so that a bank signal is generated in the rotor even though the bank take-off at the artificial horizon is in a neutral position. Displacement of the rotor of device 315 simultaneously causes an angular displacement of the rotor of an inductive rate receiver device 336 (Figure 7) whose casing supporting the stator portion is also mounted within a portion of casing 302, and also causes a displacement of the rotor of device 330.

This is accomplished by reason of a bracket 337 carried at the opposite end of rotor shaft 335, the bracket supporting a pin 338 (Figure 8) which cooperates with a slot 339 of a lever 340 pivoted on a pin 341 supported by a bracket 342 which is carried by a carriage 343. Lever 340 is provided with a second slot 344 with which cooperates a pin 345 carried by a bracket 346 fastened to a shaft 347 of the rotor of device 336. A spring 348 anchored at one end to a portion of casing 302 connects at its other end to lever 340 to absorb any backlash in the system. Thus motion on the part of rotor shaft 335 results in angular motion of rotor shaft 347 whereby a rate signal is generated in the rotor of device 336 even though at that moment no signal is being called for by the rate gyro take-off.

Figure 5:
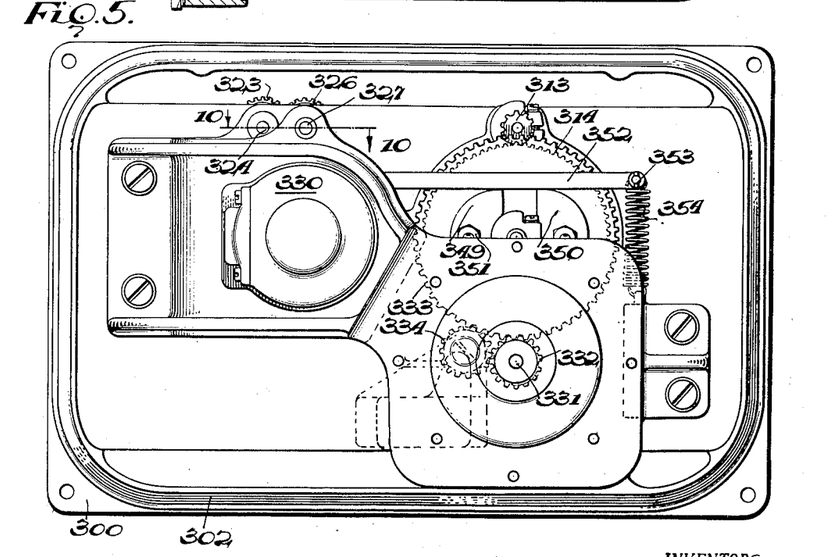
Figure 5 is a rear view with the cover removed of the control panel of Figure 2.
Figure 8:
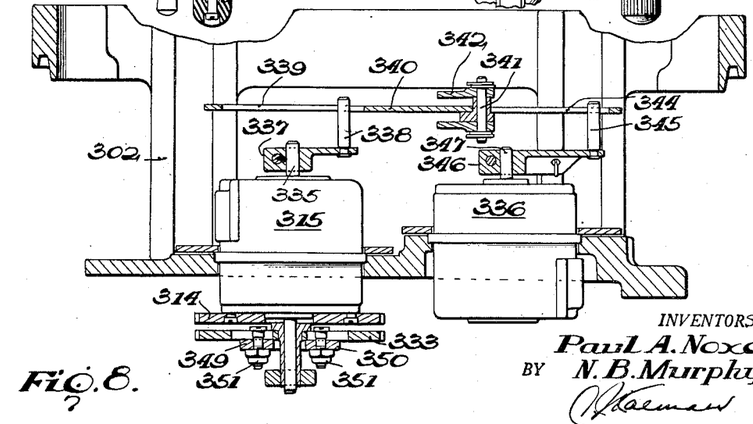
Figure 8 is a section view taken substantially along line 8—8 of Figure 7.
Figures 9, 10:
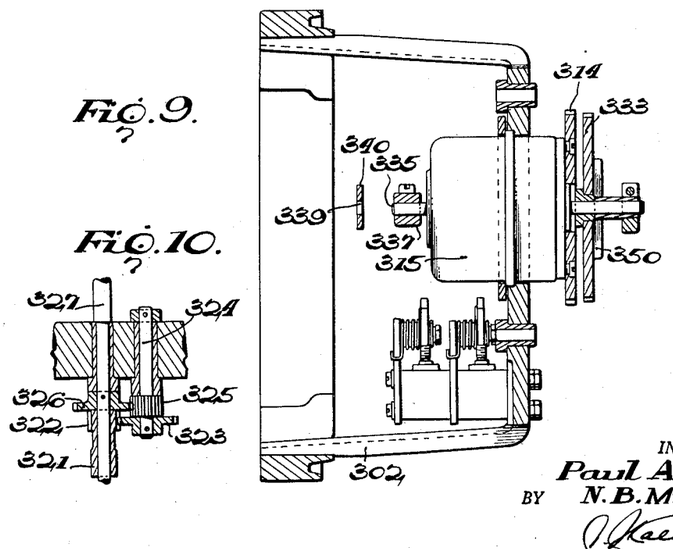
Figure 9 is a section view taken substantially along line 9—9 of Figure 7.
Figure 10 is a detail view of a portion of the structure of Figure 4.

As more clearly shown in Figure 5, the end of shaft 335 supporting gears 314 and 333 thereon also supports two spaced cam members 349 and 350 which may be adjusted either outwardly or inwardly with respect to each other by virtue of screws 351 (see Figure 8). In engagement with the cams is a lever 352 and has a spring 354 anchored thereto at 353, the opposite end thereof being anchored to casing 302. The opposite end of lever 352 is provided with a bracket 355 which is fastened to a shaft 356 of the rotor of device 330 whereby motion of lever 352 angularly displaces the rotor relative to its stator so that an electrical signal is generated in the rotor of device 330 even though at that moment no signal is being called for by the pitch take-off at the artificial horizon.

The extreme end of turn knob shaft 331 is provided with a wheel 360, Figure 7, having a single notch at its outer periphery in which normally rests a finger 361, pivoted at 362, and carrying a trip member 363 which abuts one of two contacts (similar to contact 233 of Figure 1)

mounted within a suitable switch box 364. Thus, immediately upon actuation of turn knob 306, the contacts (not shown) within switch box 364 are opened (see Figgure 1) to de-energize coil 67 of the magnetic clutch whereby the controlling connection between the magnetic field pick-up device and the motor 91 of the rudder servo system is opened so that induction motor 91 is under the sole control of the rate signal as heretofore explained.

Figure 6:
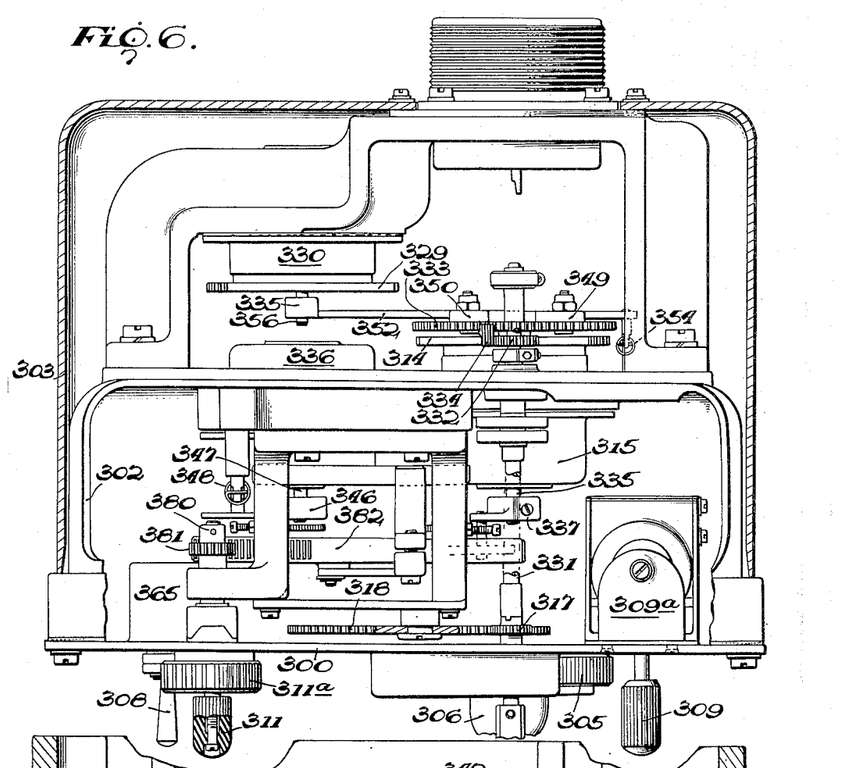
Figure 6 is a bottom view of the structure of Figure 5.

Power switch 308 of the panel operates contacts (not shown) arranged within a switch box 365 (Figure 6). This switch is similar to switch 74 of Figure 1 and its operation will be understood from the description given relating to Figure 1. Throwing switch 308 from its "off" position to its "on" position closes contacts 73 of Figure 1 and places one of the contacts 71 of the servo clutch switch 72 across battery 69.

Switch 309 arranged on panel 300 of Figure 2 likewise operates a pair of contacts arranged within a suitable switch box 309a mounted to the rear of the panel, the contacts being designated at 71 in Figure 1. With the throwing of clutch switch 309 from its "out" to its "in" position, contacts 71 of Figure 1 are closed so that servo solenoid coils 106, 168 and 201 are energized to connect the induction motors to their respective control surfaces and at the same time coil 67 of the magnetic clutch is energized to establish a driving connection between the inductive coupling device 29 of the master indicator and the inductive transmitting device 77, assuming turn knob 306 of the panel to be in its neutral position. Operation of switch 309 to its "out" position de-energizes the solenoids as well as coil 67.

With switch 309 in its "in" position and power switch 308 in its "on" position, actuation of turn knob 306 causes de-energization of coil 67 and opens the driving connection between the rudder motor 91 and the magnetic field pick-up device but the solenoids of the rudder, aileron and elevator servo systems remain energized.

Airspeed adjustment knob 311 is fastened to a shaft 380, the latter being provided with a pinion 381 (Figure 7) for meshing with a toothed rack 382 fastened to carriage 343. Actuation of knob 311 in one direction or another moves carriage 343 together with bracket 342 in one direction or another to thereby move lever 340 in one direction or another relative to pins 338 and 345. Such relative motion varies the lever length of lever 340 so that in one position a given angular movement of the rotor of device 315 will produce a given angular movement of the rotor of device 336 while in another position for the same angular movement of the rotor of device 315 a different movement will be imparted to the rotor of device 336 so that a varied signal is generated in the latter rotor to increase or decrease the value of the rate signal set in to compensate for widely varying airspeeds.

If desired, a pilot's disconnect switch 400 may also be provided, which may be located on the pilot's wheel, so that if it is desired to de-energize the servo-clutches, the pilot need merely depress a button 401 which connects a coil 402 to ground thereby energizing the coil whereupon a core 403 is urged outwardly to open servo clutch switch 72. As soon as switch 72 is opened, coil 402 is de-energized but does not close switch 72, the latter requiring a direct operation of the switch.

The novel automatic turn mechanism above described is of such a character that extreme flexibility of control is provided by the automatic pilot which makes it possible to execute maneuvers by turning appropriate controls on the panel. Sharply banked turns may be made by actuation of the turn control knob, the craft immediately returning to straight flight when the knob is returned to its central position. Steep climbs or dives may be made by operating the pitch trim knob. Moreover, a combination of turns and climbs or turns and dives may also be executed or the craft quickly thrown from a correctly banked turn in one direction to a correctly banked turn in an opposite direction.

Although but a single embodiment of this invention has been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the present invention reference will be had primarily to the appended claims.

What is claimed is:

1. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, and control means for operating said rate of course change responsive means and said attitude change responsive means and for simultaneously disconnecting said course change responsive means from said rudder to automatically vary the course and attitude of said craft.

2. In an automatic pilot for aircraft provided with rudder, aileron and elevator control surfaces, the combination of course change responsive means, rate of course change responsive means, bank responsive means, pitch responsive means, said first two named responsive means controlling said rudder, said bank responsive means controlling said ailerons, and said pitch responsive means controlling said elevators, and a single control means for operating said rate of course change responsive means, said bank responsive means and said pitch responsive means and for simultaneously disconnecting said course change responsive means from said rudder, whereby said craft may be swung automatically into a predetermined rate of turn at the correct angle of bank and with the proper elevator adjustment for said turn.

3. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, and a remote control panel for said pilot comprising a single element thereon for operating said rate of course change responsive means and said attitude change responsive means and for simultaneously disconnecting said course change responsive means from said rudder.

4. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, a remote control panel for said pilot comprising a knob for operating said rate of course change responsive means and said attitude change responsive means, and means simultaneously actuated by said knob for disconnecting said course change responsive means from said rudder.

5. A system for controlling the rudder of an aircraft, comprising course change responsive means, rate of turn responsive means, said two last-named means normally actuating said rudder, a control panel for said system, said rate of turn responsive means comprising a rate of turn take-off and a repeater device, the repeater device being arranged at said panel and connected to said take-off, and turn means at said panel for actuating said device independently of said take-off for controlling said rudder and for simultaneously disconnecting said course change responsive means from said rudder so that said turn means and rate of turn responsive means actuate said rudder.

6. An automatic control system for aircraft having a control surface, comprising course change responsive means, rate of turn responsive means, said two last-named means normally actuating said surface, said rate of turn responsive means comprising a rate of turn gyro and a take-off therefor together with a repeater device connected to said take-off, and a control knob for actuating said repeater device independently of said gyro and said take-off and for simultaneously disconnecting said course change responsive means from control of said surface so that said control knob and rate of turn responsive means actuate said surface.

7. An automatic control system for aircraft having a control surface, comprising course change responsive means for normally controlling said surface, a rate of turn gyro, first signal means at said gyro for generating a first signal proportional to the rate of turn of the craft, second signal means connected to said first signal means and adapted for modifying control of said surface in accordance with said first signal, and means for actuating said second signal means to generate a predetermined signal for actuating said surface even though no signal is present at said first signal means and for simultaneously disconnecting control of said surface from said course change responsive means whereby said craft is controlled so as to cause said first signal to cancel said last signal.

8. A control system for aircraft having a rudder, comprising course change responsive means for normally controlling said rudder, a rate of turn gyro, an inductive transmitter device actuated by said gyro for generating an electrical signal proportional to the rate of turn of the craft from a prescribed course, an inductive repeater device connected to said transmitter device for modifying control of said rudder in accordance with the signal generated at said transmitter, and means for actuating said repeater device to generate a predetermined electrical signal for actuating said rudder even though no signal is present at the transmitter and for simultaneously disconnecting control of said rudder from said course change responsive means so that said transmitter and repeater devices control said rudder.

9. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, a control panel for said pilot, said rate of course change responsive means comprising a rate take-off and a repeater device connected thereto and arranged at said panel, said attitude change responsive means comprising bank and pitch take-offs and repeater devices connected thereto and arranged at said panel, and automatic turn control means at said panel for actuating said rate, bank and pitch repeater devices independently of their respective take-offs and for simultaneously disconnecting said course change responsive means from said rudder.

10. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, a control panel for said pilot, said rate of course change responsive means comprising a rate take-off and a repeater device connected thereto and arranged at said panel, said attitude change responsive means comprising bank and pitch take-offs and repeater devices connected thereto and arranged at said panel, and a single turn control knob on said panel for actuating said rate, bank and pitch repeater devices for controlling their respective control surfaces independently of their respective take-offs and for simultaneously disconnecting said course change responsive means from said rudder.

11. In an automatic pilot for aircraft provided with rudder, aileron and elevator control surfaces, the combination of course change responsive means, rate of course change responsive means, attitude change responsive means, said first two named responsive means controlling said rudder, and said last-named responsive means controlling said aileron and elevator surfaces, said rate of course change responsive means comprising a rate take-off and a relatively remote repeater device connected thereto, said attitude responsive means comprising bank and pitch take-offs and relatively remote repeater devices connected thereto, and common means for actuating said rate, bank and pitch repeater devices for controlling their respective control surfaces independently of their respective take-offs and for simultaneously disconnecting said course change responsive means from said rudder.

12. In an automatic pilot for aircraft provided with rudder, aileron and elevator surfaces, the combination of course change responsive means, rate of course change responsive means, attitude change responsive means, said first two named responsive means controlling said rudder, and said last-named responsive means controlling said aileron and elevator surfaces, a control panel for said pilot, said rate of course change responsive means comprising a rate of turn gyro and an electrical take-off therefor together with a repeater device connected to said take-off and arranged at said panel, said attitude change responsive means comprising an artificial horizon gyro and electrical bank and pitch take-offs thereat together with repeater devices connected to said bank and pitch take-offs and arranged at said panel, and a turn knob on said panel for actuating said rate, bank and pitch repeater devices whereby electrical signals are generated therein for actuating their respective control surfaces independently of their respective take-offs and for simultaneously disconnecting said course change responsive means from said rudder.

13. In an automatic pilot for aircraft provided with rudder, aileron and elevator surfaces, the combination of course change responsive means, a rate of course change responsive means, attitude change responsive means, said first two named responsive means controlling said rudder, and said last-named responsive means controlling said aileron and elevator surfaces, a control panel for said pilot, said rate of course change responsive means comprising a rate of turn gyro and an electrical take-off therefor together with a repeater device connected to said take-off, said repeater device comprising a stator arranged at said panel and an angularly movable rotor inductively associated with the stator, said attitude change responsive means comprising an artificial horizon gyro and electrical bank and pitch take-offs thereat together with repeater devices connected to said bank and pitch take-offs, said repeater devices comprising stators arranged at said panel and angularly movable rotors inductively associated with the last-named stators, and a turn control knob on said panel for angularly displacing the rotors of said rate, bank and pitch repeater devices whereby signals are generated therein for operating their respective control surfaces independently of their respective take-offs and for simultaneously disconnecting said course change responsive means from said rudder.

14. In an automatic pilot for aircraft provided with rudder, aileron and elevator surfaces, the combination of course change responsive means, rate of course change responsive means, attitude change responsive means, said first two named responsive means controlling said rudder, and said last-named responsive means controlling said aileron and elevator surfaces, a control panel for said pilot, said rate of course change responsive means comprising a rate of turn gyro and an electrical take-off therefor together with a repeater device connected to said take-off, said repeater device comprising a stator arranged at said panel and an angularly movable rotor inductively associated with the stator, said attitude change responsive means comprising an artificial horizon gyro and electrical bank and pitch take-offs therefor together with repeater devices connected to said bank and pitch take-offs, said repeater devices comprising angularly movable stators arranged at said panel and angularly movable rotors inductively associated with the last-named stators, a bank trim knob on said panel for angularly moving the stator of said bank repeater device, a pitch control knob on said panel for angularly moving the stator of said pitch repeater device, and a turn control knob on said panel for angularly displacing the rotors of said rate, bank and pitch repeater devices and for simultaneously disconnecting said course change responsive means from said rudder.

15. In an automatic pilot for aircraft provided with rudder, aileron and elevator surfaces, the combination of course change responsive means, rate of course change responsive means, attitude change responsive means, said first two named responsive means controlling said rudder, and said last-named responsive means controlling said aileron and elevator surfaces, a control panel for said pilot, said rate of course change responsive means comprising a rate of turn gyro and an electrical take-off therefor together with a repeater device connected to said take-off, said repeater device comprising a stator arranged at said panel and an angularly movable rotor inductively associated with the stator, said attitude change responsive means comprising an artificial horizon gyro and electrical bank and pitch take-offs therefor together with repeater devices connected to said bank and pitch take-offs, said repeater devices comprising angularly movable stators arranged at said panel and angularly movable rotors inductively associated with the last-named stators, a bank trim knob on said panel for angularly moving the stator of said bank repeater device, a pitch control knob on said panel for angularly moving the stator of said pitch repeater device, a turn control knob on said panel coaxial with said pitch control knob for angularly displacing the rotors of said rate, bank and pitch repeater devices and for simultaneously disconnecting said course change responsive means from said rudder, and a vernier pitch trim knob on said panel for angularly moving the stator of said pitch repeater device.

16. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servo in response to the rate of turn developed by said craft when it departs from said predetermined course, attitude change responsive means for controlling said aileron and elevator servomotors to actuate said ailerons and elevator when said craft departs from a predetermined attitude, a control panel for said pilot, said rate of turn responsive means and said attitude change responsive means comprising repeater devices arranged at said panel, means on said panel for connecting said servomotors to and disconnecting said servomotors from their respective control surfaces and for simultaneously connecting said course change responsive means to and disconnecting it from said rudder servomotor, and means for automatically turning said craft comprising a turn control knob on said panel for actuating said rate and attitude repeater devices and for simultaneously disconnecting said course change responsive means from said rudder servomotor.

17. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servo in response to the rate of turn developed by such craft when it departs from said predetermined course, attitude change responsive means for controlling said aileron and elevator servomotors to actuate said ailerons and elevator when said craft departs from a predetermined attitude, a control panel for said pilot, said attitude change responsive means comprising master bank and pitch signal transmitters and remotely located repeating devices therefor supported by said panel, and means comprising bank and pitch control knobs on said panel for actuating said bank and pitch signal repeating devices independently of said master bank and pitch signal transmitters.

18. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servo in response to the rate of turn developed by said craft when it departs from said predetermined course, attitude change responsive means for controlling said aileron and elevator servomotors to actuate said ailerons and elevator when said craft departs from a predetermined attitude, a control panel for said pilot, and switch means on said panel for connecting said servomotors to and disconnecting said servomotors from their respective control surfaces and for simultaneously connecting said course change responsive means to and disconnecting it from said rudder servomotor.

19. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servo in response to the rate of turn developed by said craft when it departs from said predetermined course, attitude change responsive means for controlling said aileron and elevator servomotors to actuate said ailerons and elevator when said craft departs from a predetermined attitude, a control panel for said pilot, said attitude change responsive means comprising a master pitch signal transmitter and a remote repeater device therefor supported by said panel, and a pitch control knob on said panel for actuating said pitch signal repeater device independently of said master pitch transmitter.

20. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servomotor, in response to the rate of turn developed by said craft when it departs from said predetermined course, attitude change responsive means for controlling said aileron and elevator servomotors to actuate said ailerons and elevator when said craft departs from a predetermined attitude, a control panel for said automatic pilot, said rate of turn responsive means and said attitude change responsive means comprising repeater devices arranged at said panel, switch means on said panel for connecting said servomotors to and disconnecting them from their respective control surfaces and for simultaneously connecting said course change responsive means to and disconnecting it from said rudder servomotor, control means on said panel for actuating said attitude repeater device, and means for automatically turning said craft comprising a turn control knob on said panel for actuating said rate and attitude repeater devices and for simultaneously disconnecting said course change responsive means from said rudder servomotor.

21. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, rate of turn responsive means for modifying the operation of said rudder servo in response to the rate of turn developed by said craft when it departs from said predetermined course, attitude change responsive means for controlling said aileron and elevator servomotors to actuate said ailerons and elevator when said craft departs from a predetermined attitude, a control panel for said pilot, said rate of turn responsive means and said attitude change responsive means comprising repeater devices arranged at said panel, switch means on said panel for connecting said servomotors to and disconnecting said servomotors from their respective control surfaces and for simultaneously connecting said course change responsive means to and disconnecting it from said rudder servomotor, means for automatically turning said craft comprising a turn control knob on said panel for actuating said rate and attitude repeater devices and for simultaneously disconnecting said course change responsive means from said rudder servomotor, and an airspeed adjustment knob on said panel for varying the operation of said repeater devices to compensate for changes in airspeed.

22. In an automatic pilot for aircraft provided with an elevator surface thereon, the combination of transmitter means having a signal normally generally therein in response to the departure of said craft from a predetermined attitude about its transverse axis and repeater means connected thereto for repeating and transmitting said signal for actuating said surface to return said craft to said predetermined attitude, a control panel for said pilot, said repeater means being arranged at said panel, and a knob on said panel for actuating said repeater means when said craft is in said predetermined attitude for generating a signal therein independently of said transmitter means whereby said surface is actuated to cause said craft to depart from said predetermined attitude.

23. In an automatic pilot for aircraft provided with an elevator surface thereon, the combination of means having an electrical signal normally generated therein in response to the departure by said craft from a predetermined attitude about its transverse axis for actuating said surface to return said craft to said predetermined attitude, a control panel for said pilot, said means being arranged at said panel, a knob on said panel for actuating said first-named means when said craft is in said predetermined attitude for generating an electrical signal therein whereby said surface is actuated to cause said craft to depart from said predetermined attitude, and a trim knob on said panel comprising a vernier adjustment for said first-named knob.

24. In an automatic pilot for aircraft provided with an elevator surface thereon, the combination of means having a signal normally generated therein in response to the departure by said craft from a predetermined attitude about its transverse axis for actuating said surface to return said craft to said predetermined attitude, a control panel for said pilot, said means comprising an artificial horizon and a pitch take-off thereat together with a repeater connected to said take-off for repeating and communicating said signal to said surface, said repeater device being arranged at said panel, and means on said panel for actuating said repeater device independently of said pitch take-off whereby a signal is generated therein when said craft is in said predetermined attitude for actuating said surface to cause said craft to depart from said predetermined attitude.

25. In an automatic pilot for aircraft having master instruments for developing pitch and bank signals in response to a departure by said craft from a predetermined attitude, a control panel for said pilot comprising a casing, means mounted within said casing and connected to said master instruments for developing signals therein in response to the pitch and bank signal developed by said master instruments, and means exterior of said panel for actuating said means selectively or in unison to set up bank and/or pitch signals therein independently of said master instruments even though said craft is in said predetermined attitude.

26. In an automatic pilot for aircraft having master instruments for developing direction rate, pitch and bank signals in response to a departure by said craft from a predetermined direction and attitude, a control panel for said pilot comprising a casing, means mounted within said casing and connected to said direction rate signal developing means for repeating said rate signal to control said craft in direction, other means mounted within said casing and connected to said pitch and bank signal developing means for repeating said signals to control said craft in attitude, and means exterior of said panel for actuating said direction rate, pitch and bank repeating means for setting up rate, bank and pitch signals therein even though said craft is on said prescribed course and in said predetermined attitude.

27. An automatic pilot for aircraft having a rudder, comprising course change responsive means and rate of turn responsive means connected for actuating said rudder, said rate of turn responsive means comprising a rate of turn take-off and a repeater device connected thereto, and means for actuating said repeater device independently of said take-off for controlling said rudder in addition to the controlling by said rate of turn responsive means.

28. An automatic pilot for aircraft having a rudder, comprising course change responsive means and rate of turn responsive means connected for actuating said rudder, said rate of turn responsive means including a rate of turn take-off, and turn means including a repeater device connected to said take-off, and means for actuating said repeater device independently of said take-off for controlling said rudder and for simultaneously disconnecting said course change responsive means from said rudder whereby said turn means and said rate of turn responsive means controls said rudder when said repeater device is actuated and said course change means does not control the rudder.

29. An automatic pilot for aircraft having a surface actuable to control the course of the craft, comprising course change responsive means and rate of turn responsive means normally connected for actuating said rudder, said rate of turn responsive means including a rate of turn gyro and an electrical take-off therefor, and turn control means including an electrical repeater connected to said take-off, and control means for actuating said repeater independently of said take-off for controlling said surface and for simultaneously disconnecting said course change responsive means from said surface so that control of said surface is changed from the normal control by said course change responsive means and said rate of turn responsive means to control by said turn control means and said rate of turn responsive means.

30. In an automatic pilot for aircraft having a control surface for controlling the movement of said aircraft about a control axis, position-maintaining means for detecting angular movement of said aircraft about said control axis, rate-responsive means for detecting rate of angular movement of said aircraft about said control axis, servo means for actuating said control surface, a turn controller, means actuated by said position-maintaining means, said rate-responsive means, and said servo means, for generating control signals, means for algebraically adding said control signals and controlling said servo means in accordance with the resultant thereof, and means responsive to movement of said turn controller from a neutral position for rendering said position-maintaining means ineffective and for producing an additional control signal for controlling the position of said servo means, the signals produced in accordance with the rate of turn of said aircraft tending to oppose angular turning of said aircraft about said control axis whereby when said turn controller is in said neutral position said rate of turn-responsive means acts to stabilize said aircraft in straight flight and when said turn controller is displaced to initiate a turn said rate-of-turn-responsive device acts to maintain a rate of turn variable in accordance with signal produced by movement of said turn controller.

31. Control apparatus for an aircraft having a first control surface for controlling the aircraft about the roll axis and a second control surface for controlling the aircraft about the vertical axis comprising: an operating means for said first surface; an operating means for said second surface; a first electrical signal producing means responsive to movement of the craft about the roll axis; a second electrical signal producing means responsive to movement of the craft about the vertical axis; a manually operable third electrical signal producing means; a fourth electrical signal producing means responsive to the rate of turn of the craft about the vertical axis; a control means for said first operating means; a control means for said second operating means; signal combining means for operating said first control means from said first and manually operable signal producing means; a signal combining means for operating said second control means from said second and fourth signal producing means; and means for preventing operation of said second signal producing means while said manually operable signal means is producing a signal to change the heading of said craft and while said fourth electrical signal means remains operative.

32. Control apparatus for an aircraft having a first control surface for controlling the aircraft about the roll axis and a second control surface for controlling the aircraft about the vertical axis comprising: an operating means for said first surface; an operating means for said second surface; a first electrical signal producing means responsive to movement of the craft about the roll axis; a second electrical signal producing means responsive to movement of the craft about the vertical axis; a manually operable third electrical signal producing means; a fourth electrical signal producing means responsive to the rate of turn of the craft about the vertical axis; a control means for said first operating means; a control means for said second operating means; signal combining means for operating said first control means from said first and manually operable signal producing means; a signal combining means for operating said second control means from said second and fourth signal producing means; means for preventing operation of said second signal producing means while said manually operable signal means is producing a signal to change the heading of said craft and while said fourth electrical signal means remains operative; and means for connecting the third signal producing means to said second combining means so that said second control means is operated from said third and fourth signal producing means.

33. A system for controlling the movement of a surface of a craft comprising displacement reference means adapted for providing a first electrical signal corresponding to the displacement of the craft from a predetermined condition, rate responsive means for providing a second electrical signal corresponding to the rate of turn of the craft about an axis, a motor normally controlled by said first and second signals for moving said surface, and means for developing a third electrical signal to change the condition of said craft and simultaneously stopping the development of said first signal, said rate responsive means remaining operable during the change in condition to develop said second signal so that said motor is controlled by said second and third signals.

34. A system for controlling the position of a member, comprising first means normally providing a signal proportional to the amount and direction of deviation of a condition from a predetermined value, second means providing a signal proportional to the rate and direction of said deviation, motor means adapted for positioning said member in accordance with said signals from said first and second means, and third means adapted for varying the magnitude of said signal from said second means and rendering said first means ineffective to provide a signal so that said motor positions said member in accordance with the signals from said second and third means.

References Cited in the file of this patent

UNITED STATES PATENTS

| | | |
|---|---|---|
| 1,754,954 | Johnson | Apr. 15, 1930 |
| 1,801,948 | Boykow | Apr. 21, 1931 |
| 1,836,881 | Sperry | Dec. 15, 1931 |
| 2,005,530 | Boykow | June 18, 1935 |
| 2,016,857 | Fischel | Oct. 8, 1935 |
| 2,066,194 | Bates | Dec. 29, 1936 |
| 2,144,616 | Carlson | Jan. 24, 1939 |
| 2,162,862 | Protzen | June 20, 1939 |
| 2,197,898 | Roland et al. | Apr. 24, 1940 |
| 2,203,671 | Carlson | June 11, 1940 |
| 2,283,754 | Matthews | May 19, 1942 |
| 2,415,430 | Frische et al. | Feb. 11, 1947 |

FOREIGN PATENTS

| | | |
|---|---|---|
| 379,109 | Great Britain | Aug. 25, 1932 |